United States Patent [19]

Schinabeck

[11] 3,992,358

[45] *Nov. 16, 1976

[54] EPOXY RESIN COMPOSITIONS

[75] Inventor: Rainer Schinabeck, Scituate, Mass.

[73] Assignee: American Velodur Metal, Inc., Scituate, Mass.

[ * ] Notice: The portion of the term of this patent subsequent to Aug. 24, 1993, has been disclaimed.

[22] Filed: May 20, 1975

[21] Appl. No.: 579,203

Related U.S. Application Data

[63] Continuation-in-part of Ser. No. 566,968, April 10, 1975, Pat. No. 3,935,252.

[52] U.S. Cl. .......................... 260/47 EN; 260/2 N; 260/37 EP

[51] Int. Cl.² ..................................... C08G 59/06

[58] Field of Search ........... 260/37 EP, 2 N, 47 EN, 260/570.5 P, 570.9

[56] References Cited
UNITED STATES PATENTS 3,850,661  11/1974  Dreher et al. ............... 260/47 EN X 3,852,240  12/1974  Smith ........................ 260/47 EN X

*Primary Examiner*—Lewis T. Jacobs
*Attorney, Agent, or Firm*—Stanley D. Schwartz

[57] ABSTRACT

Compositions whose hardenable components comprise a mixture of (1) a hardenable 1,2-epoxy resin having more than one 1,2-epoxy group per molecule and (2) a hardening agent of the formula:

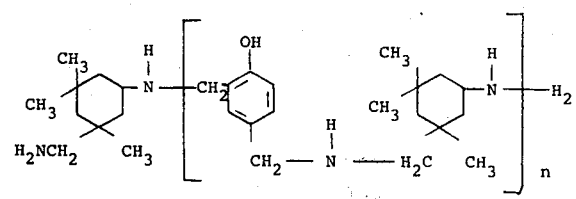

wherein $n$ has a value of at least 2.

8 Claims, No Drawings

EPOXY RESIN COMPOSITIONS

This application is a continuation-in-part of our co-pending application, Ser. No. 566,968, filed Apr. 10, 1975, now U.S. Pat. No. 3,935,252, issued Jan. 27, 1976.

BACKGROUND OF THE INVENTION

The present invention relates to epoxy resin compositions and more particularly, to epoxy resin compositions capable of hardening at or below room temperature including temperatures as low as about 5° C.

Epoxy resins have been known and used commercially for some time and these resins have been described in detail in numerous publications and prior patents. Epoxy resins are known to produce a number of valuable products, and particularly in the coating arts, the epoxy resins are known to produce infusible, insoluble coatings or films which when properly cured, exhibit desirable properties such as toughness, thermal stability, and the like. The curing agents for such epoxy resins, however, have been found to leave something to be desired. Some of the curing agents taught in the prior art have been found to react too rapidly and thus have such a short "pot life" that the handling of the α-epoxy resins prior to hardening is considerably difficult. Still other curing or hardening agents provide objectionable results which include undesirably slow curing, low impact resistance, brittleness, inability to cure or harden an epoxy resin under humid conditions, on wet or oily surfaces as well as on surfaces submerged under water.

OBJECTS OF THE INVENTION

It is therefore a significant object of the present invention to provide hardenable epoxy resin compositions capable of overcoming the above-noted problems of the prior art.

Still another object of the present invention is the provision of hardenable epoxy resin composition that are capable of hardening at or below room temperatures and as low as about 5° C without having to supply any external source of heat to effect the hardening of resin.

These and other objects, features and advantages of the present invention will become apparent to those skilled in the art from the following detailed disclosure thereof.

BRIEF SUMMARY OF THE INVENTION

Briefly, the invention relates to compositions whose hardenable components comprise a mixture of (1) a hardenable 1,2-epoxy resin having more than one 1,2 epoxide grouping per molecule and (2) a hardening agent in the formula:

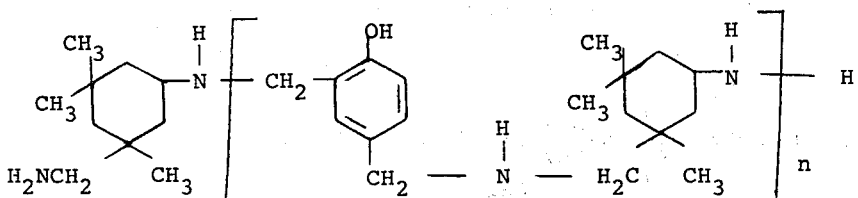

wherein $n$ has a value of at least 2. Cured compositions comprising the reaction product of said epoxy resin and hardening agents are also discussed in detail.

DETAILED DISCLOSURE OF THE INVENTION

The hardening agents of this invention, as noted above, have a value wherein n is at least 2, and preferably from 2 to 5. Best results are generally achieved when n has a value of 2.

The hardening agents employed in the practice of this invention are useful for the hardening of a broad spectrum of epoxy resins or polyepoxides which comprise those organic materials possessing at least one and preferably more than one 1,2-epoxy group, i.e.,

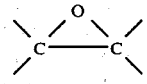

The epoxy compounds may be saturated or unsaturated aliphatic, cycloaliphatic, aromatic or heterocyclic and may contain substituents such as halogen atoms, hydroxyl groups, ether radicals, and the like. They may be monomeric or polymeric.

Generally, such epoxide resins comprise a polyether derivative of a polyhydric organic compound, said derivative containing 1,2-epoxy groups and said compound being selected from the group consisting of polyhydric alcohols and phenols containing at least two phenolic hydroxy groups.

Among the polyhydric phenols which may be used in preparing such glycidyl polyethers are the mononuclear phenols such as resorcinol, catechol, hydroquinone, etc., and the polynuclear phenols such as bis(4-hydroxyphenyl)-2,2-propane, 4,4'-dihydroxybenzophenone, bis(4-hydroxyphenyl)-1,1-ethane, bis(4-hydroxyphenyl-1,1-isobutane, bis(4-hydroxyphenyl)-2,2-butane, bis(4-hydroxy-2-methylphenyl)-2,2-propane, bis(4-hydroxy-2-tertiary butylphenyl)-2,2-propane, bis(4-hydroxy-2,5-dichlorophenyl)-2,2-propane, 4,4'-dihydroxybisphenyl-4,4'-dihydroxypentachlorobisphenyl, bis(2-hydroxynaphthylmethane, 1,5-dihydroxynaphthalene, phloroglucinol, 1,4-dihydroxynaphthalene, 1,4-bis(4-hydroxyphenyl)cyclohexane, etc., as well as other complex polyhydric phenols, such as pyrogallol, phloroglucinol and novalac resins from the condensation of a phenol with an aldehyde in the presence of an acidic condensation catalyst. For the nature and preparation of novalac resins, see the book by T. S. Carswell, Phenylplast, 1947, page 29 et. seq.

There can also be used 1,2-epoxy containing ethers of aliphatic polyhydric alcohols, such as polyglycidyl ethers thereof, as for example, the diglycidyl ethers of ethylene glycol, propylene glycol, trimethylene glycol, butylene glycol, diethylene glycol, 4,4'-dihydroxydicyclohexyl triethylene glycol, glycerol, dipropylene glycol, and the like, as well as ethers containing more than two glycidyl groups such as the glycidyl polyethers, glycerol, mannitol, sorbitol, polyalkyl alcohol, polyvinyl alcohol, and the like.

These epoxide resins, or glycidyl polyethers as they are frequently called may be prepared by reacting predetermined amounts of at least one polyhydric compound and one epihalohydrin in an alkaline medium.

While it is preferred to use epichlorohydrin as the epihalohydrin in the preparation of the epoxide starting materials, other epihalohydrins such as epibromohydrin may be used advantageously.

In the preparation of the epoxide resins, aqueous alkali is employed to combine with the halogen of the epihalohydrin. The amount of alkali employed should be substantially equivalent to the amount of halogen present and, preferably, should be employed in an amount somewhat in excess thereof. Aqueous mixtures of alkali metal hydroxides, such as potassium hydroxide and lithium hydroxide may be employed; although for economic reasons, sodium hydroxide is obviously preferred.

The product of the above-described reaction instead of being a singly simple compound is generally a complex mixture of glycidyl polyethers, but the principal product may be represented by the formula: $CH_2\text{-}(O\text{-}B\text{-}O\text{-}CH_2\text{-}CHOH\text{-}CH_{2n}\text{-}O\text{-}R\text{-}O\text{-}CH_2$

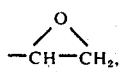

where $n$ is an integer of a series 0,1,2,3 . . . and preferably having a maximum value of 10, and R represents a divalent hydrocarbon radical of a polyhydric compound, and preferably a dihydric phenol. While for any single molecule $n$ is an integer, though the fact that the obtained polyether is a mixture of compounds, causes the determined value for $n$, e.g, from molecular weight measurements to be an average which is not necessarily a whole number.

Epoxy resins are disclosed in various places in the art; among the references which may be mentioned are U.S. Pat. Nos. 2,324,483; 2,444,333; 2,494,395; 2,500,600; 2,503,726; 2,511,913; 2,518,056; 2,558,949; 2,579,698; 2,582,985; 2,592,560; 2,615,007; 2,615,008; and 2,633,458.

Preferred polyethers for use with the hardening agents of this invention are prepared from bis(4-hydroxyphenyl)-2,2-propane and contain a chain of alternating glyceryl and 2,2-bis(phenylene) propane radicals, separated by intervening ethereal oxygen atoms and have a 1,2-epoxy equivalency between 1 and 2, and epoxide equivalent weight of about 170 to about 250. A particularly suitable material for use in the compositions of this invention is a normally liquid epoxy resins having terminable epoxy groups and an epoxide equivalent weight of about 185 to 210 and a viscosity below about 900 cps at 25° C. An example of such an epoxy resin is the reaction product of epichlorohydrin and diphenylol propane and having the following formula:

These resins preferably have a viscosity between 700 and 800 cps at 25° C. The preferred value of $n$, in the above structural formula, is approximately 0.2, whereby said resin has an approximate molecular weight of 380 although the value of $n$ can vary between 0 and 10. It is understood that when the above epoxy resin is produced, it is a mixture of compounds that causes the determined value for $n$ to be an average which is not necessarily zero or a whole number such as 1.

Another group of epoxide resins that may be used are those which are derived by the reaction of peracetics and unsaturated compounds. A typical member of this class is the epoxide resin derived from butadiene and crotonaldehyde which have undergone the Diels-Alder condensation and the Tishchenko reaction:

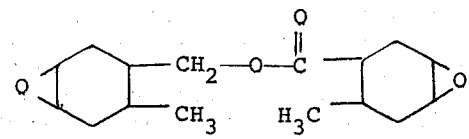

This compound is sold commercially as EP 201.

Still another group of epoxide resins are the polyepoxide polyesters which are prepared by epoxidizing the unsaturated portions of the tetrahydrophehalic residues in the polyester composition. These polyepoxide polyester compositions, as well as their preparation, are described in U.S. Pat. No. 2,847,394.

The term "epoxy equivalency" as employed in this specification refers to the number of epoxy groups contained in the average molecule of the desired material. The epoxy equivalency is obtained by dividing the average molecular weight of the polyepoxide by the so-called "epoxide equivalent weight". The epoxide equivalent weight is determined by heating one gram sample of the polyepoxide with an excess of pyridinium chloride dissolved in pyridine at the boiling point for twenty minutes. The excess pyridinium chloride is then back-titrated with 0.1 N sodium hydroxide to phenolphthalein end point. The epoxide value is calculated by considering 1 HCl as an euivalent of one epoxide. This method is used to obtain all epoxide values reported herein.

The hardening agents used in the practice of this invention are used in an amount sufficient to harden the epoxy resin to an insoluble and infusible polymer. Generally, the amount of hardening agent used should be at least a 5% stoichiometric excess, and as used herein, stoichiometric amount refers to that amount needed to furnish one amino hydrogen for every epoxy group to be reacted. Particularly superior results are obtained when the hardening agent is employed in from 5 to 50% stoichiometric excess.

The preferred hardening additive, wherein n has a value of 2, is prepared by stirring 6 mols phenol, 3 mols formaldehyde, (in the form of a 36% formalin solution) and 0.5 weight percent of triethylamine, for about 2 hours. Nine mols of 3,5,5-trimethyl-3-aminomethyl cyclohexylamine are then added to the solution and the

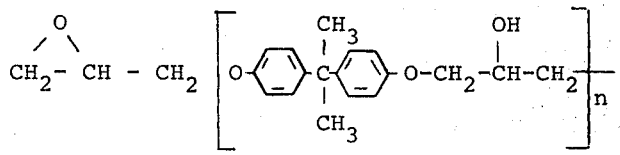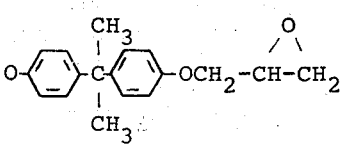

resultant solution is heated for about 1 hour at 100° C. The water produced during the reaction is removed by distillation.

The hardening agent produced is light yellow in color and is highly reactive with epoxy resins. Thus, compounds normally used to accelerate the hardening action are not required in the practice of this invention due to the high reactivity of the hardening agents of this invention with epoxy resin.

It is usually desirable to combine the hardening agent with the epoxy resin just prior to use, particularly because the hardening agent renders the composition readily curable at or near ordinary room temperature as well as under cold temperatures.

The compositions of this invention may optionally contain from about 20 to 50 percent, and preferably 33 percent by weight of the epoxy resin, at least one filler which is inert with respect to the remaining ingredients of the composition and which have a particle size up to about 50 microns. Generally, the size of the filler particles range between about 25 and 50 microns.

Examples of suitable inert fillers include sand, crushed shells, rocks, aluminum powder, copper powder, quartz powder, titanium dioxide, asbestos, silica, calcium carbonate, graphite, black iron oxide, silicon dioxide, diatomaceous earth, aluminosilicates, silicone carbide, boron carbide, vermiculite, talc, mica and the like. Best results, in terms of corrosion inhibition are obtained with stainless steel flakes, steel powder, titaniferrous magnetite oxide or mixtures thereof.

The compositions of the invention may also contain agents to promote the adequate and uniform distribution of filler particles in the resin. Best results are achieved when an effective amount of fumed silica is employed. Generally, between about 5 and 20 percent, and preferably 10 percent by weight of the above-described epoxy resin is employed.

Other optional ingredients useful for the practice of this invention include silicic acid in an amount of from about 1 to 7 percent by weight, and preferably 3 percent by weight of the epoxy resin. The silicic acid promotes the adhesion of the coating composition to wet, greasy or oily surfaces. Silicon oil may also be present in the compositions of this invention in an amount of between about 1 and 2 ounces per 120 pounds of the total base composition. The silicon oil facilitates pigment distribution when pigments are utilized in combination with the composition of this invention. The silicon oil also decreases the surface tension of the composition and facilitates the spreading of the composition on a particular substrate.

Compositions of this invention can also contain sufficient amounts of aluminum hydroxide as a flame retardant for the composition, as well as other conventional flame retardants and fire proofing agents. It is understood that other equivalent compounds can be used as a substitute for aluminum hydroxide, e.g., alumina trihydrate, although this compound is the preferred flame retardant additive for the invention. Generally, aluminum hydroxide is present in an amount of up to 5 percent by weight of the composition.

In general, the separate components of the composition can be admixed in any desired order and, if desired, combinations of two or more components may be prepared initially with the remaining components being added subsequently. However, as noted hereinbefore, it is usually desired to add the hardening agent just prior to use since the hardening agent renders the composition readily curable at or near room temperature with no external source of heat being required for hardening purposes.

The compositions of this invention may be employed for the coating and/or repair of any type of surface. These surfaces include, for example, wood, cement, metal, glass, and the like. The compositions are particularly suited for use in treating metal surfaces, such as, for example, copper, aluminum, brass, steel, and iron surfaces. The surfaces may be in any type of structure, such as for example, pipes, piling, reaction vessels, structural members of oil well drilling platforms, containers for jet fuels, heating oils and solvents, well jackets, heat exchange tubes, molds, and the like.

When the coating compositions of this invention are applied to a particular substrate to impart chemical resistance, the coating compositions are applied in an amount sufficient to provide the chemical resistance desired. More specifically, the coatings are applied in an amount sufficient to provide a film or coating of at least about 0.3 millimeters thick.

The coatings of the compositions can be applied to substrates by conventional techniques known in the art including spreading, spraying or dipping, and thereafter permitting the composition to cure at or below room temperature to form a hard, durable coating having satisfactory chemical resistance and being attractive in appearance. ACCORDINGLY,

What is claimed is:

1. A hardenable composition comprising: (1) a compound having more than one 1,2-epoxide grouping per molecule and (2) a hardening agent of the formula:

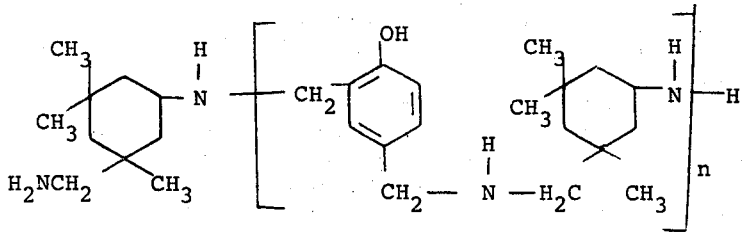

wherein $n$ has a value of at least 2.

2. The composition of claim 1, wherein $n$ has a value from 2 to 5.

3. The composition of claim 2, wherein $n$ is 2.

4. The composition of claim 1, wherein said hardening agent is present in an effective amount.

5. The composition of claim 4, wherein said epoxy compound is a liquid epoxy resin having an epoxy equivalent from about 185 to 210.

6. The composition of claim 5 wherein said epoxy resin is:

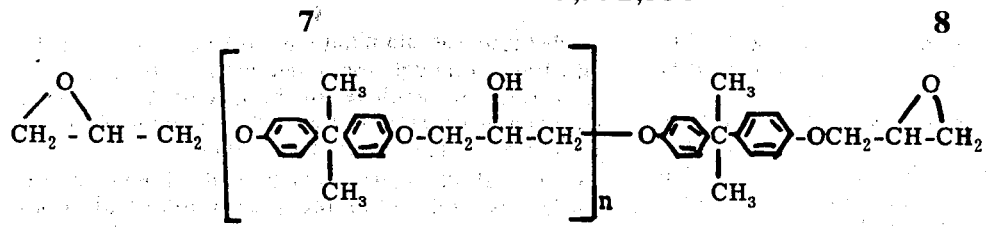
wherein *n* has a value of about 0.2.
7. A cured composition comprising the reaction product of said epoxy resin and said hardening agent of claim 1.
8. A cured composition comprising the reaction product of said epoxy resin and said hardening agent of claim 5.
* * * * *